United States Patent
Kneipp et al.

(12) 
(10) Patent No.: US 6,266,407 B1
(45) Date of Patent: Jul. 24, 2001

(54) TELEPHONY SYSTEM COMMAND SCHEDULER AND PRECEDENT PROCESSOR

(75) Inventors: Frederick Paul Kneipp, Plano, TX (US); Aaron Bentley Flett, Nashua, NH (US); Rodney Paul Hamman, Tyngsboro, MA (US)

(73) Assignee: Davox Corporation, Westford, MA (US)

( * ) Notice: Subject to any disclaimer, the term of this patent is extended or adjusted under 35 U.S.C. 154(b) by 0 days.

(21) Appl. No.: 09/219,043

(22) Filed: Dec. 23, 1998

(51) Int. Cl.$^7$ .................................................. H04M 3/00
(52) U.S. Cl. ................................... 379/265; 379/34
(58) Field of Search ................................... 379/266, 265, 379/309, 34, 201, 218

(56) References Cited

U.S. PATENT DOCUMENTS

| | | | |
|---|---|---|---|
| 5,577,112 | 11/1996 | Cambray et al. | 379/216 |
| 5,651,056 | * 7/1997 | Eting et al. | 379/88.01 |
| 5,914,951 | * 6/1999 | Bentley et al. | 379/265 X |
| 6,044,476 | * 3/2000 | Ote et al. | 714/31 |
| 6,169,787 | * 1/2001 | Shimada et al. | 379/91.01 |
| 6,175,617 | * 1/2001 | Hara | 379/156 X |
| 6,181,691 | * 1/2001 | Markgraf et al. | 371/466 X |

* cited by examiner

Primary Examiner—Creighton Smith
(74) Attorney, Agent, or Firm—Bourque & Associates, P.A.

(57) ABSTRACT

A command scheduling and precedent processing system especially suitable for use in a computer telephony system is provided. The system includes a command scheduler, which includes a graphical user interface that is configured to facilitate the input and scheduling of computer telephony system commands. A system supervisor selects commands from a list of available telephony system commands and assigns a command execution priority attribute to each selected command, both of which are provided by the graphical user interface. The system also includes a command server, including a command precedent processor, a command precedent database, an event database and at least one command table. Selected commands are forwarded by the command scheduler to the command precedent processor, which stores each received command in one of the provided command tables. The command precedent processor retrieves and executes a command if all the events that are precedent to the execution of a retrieved command have occurred. If all of the command precedent events have not occurred, then the command precedent processor either returns an unexecuted command to the appropriate command table for subsequent execution attempts or generates and forwards an alert message to an alert manager to notify the system supervisor that a command could not be executed due to the non-occurrence of at least one precedent event.

17 Claims, 6 Drawing Sheets

TELEPHONY SYSTEM COMMAND SCHEDULER AND PRECEDENT PROCESSOR

FIELD OF THE INVENTION

The present invention relates to computerized telephony systems and, in particular, to a telephony system command scheduler and precedent processor.

BACKGROUND OF THE INVENTION

Automated telephone systems, which coordinate and optimize performance of operators of facilities for out-dialing large volumes of telephone calls and which receive large volumes of telephonic requests for information, are well known. Such systems typically involve a plurality of operators using telephones and operating terminals connected to computerized telephone management systems. These systems typically include autodialers, which improve the efficiency of operations with high volume outbound calling requirements. Computerized telephony systems increase operator or agent productivity significantly and provide management with a tool for streamlining and controlling operations. These systems automatically place outbound calls from a predetermined list of phone numbers and keep track of no answers, busy signals, and other line conditions and connect live calls to an agent who is simultaneously furnished a data screen having information regarding the account of the phone number reached. In high volume calling operations, such as collections, direct telephone sales, fund raising and market research and polling, among others; these systems provide flexibility in the rate of call placement and can provide significant data management options.

Typical computerized telephony systems are monitored and controlled by a system supervisor, who can schedule and direct call campaigns, monitor statistics relating to call scheduling, such as the number of calls made per agent, the average talk time and the number of unanswered calls. However, one drawback of telephony system supervision is that a system supervisor must be on duty at all times of system operation. Another drawback is that there is currently no system available that allows a system supervisor to schedule telephony system commands according to relative command execution priorities and have the system execute the scheduled commands according to those execution priorities. Furthermore, since most telephony system commands can only be successfully executed if one or more command execution precedent events have occurred, it is would be desirable to have a system that can access a knowledge base of such command execution precedent events and determine if all required execution precedent events have occurred at the desired time of a command's execution, even if command execution is immediately scheduled, is scheduled to occur as a routine command with no immediate priority or is scheduled to be executed as a specified time in the future.

These drawbacks and system requirements are satisfied with a computer telephony, command scheduling and precedent processing system according to the teachings of the present invention.

SUMMARY OF THE INVENTION

Accordingly, a command scheduling and precedent processing system, especially suitable for use in a computer telephony system, is provided. The system includes a command scheduler, which includes a graphical user interface that runs on at least one supervisor/manager terminal and which is configured to facilitate the input and scheduling of computer telephony system commands. A system supervisor simply selects commands to be executed from a list of available telephony system commands provided by the graphical user interface. Each selected command is assigned a command execution priority attribute, which the system supervisor may also select from a list of available priority attributes provided by the graphical user interface.

The system also comprises a command server, which includes a command precedent processor, a command precedent database, an event database and at least one command table. Selected commands are forwarded by the command scheduler to the command precedent processor, which stores each received command in one command table. The command table selected is the command table associated with the command execution attribute assigned to the command. The command tables utilize a first-in, first-out storage and retrieval strategy.

The command precedent processor retrieves commands from the command tables according to their relative command execution priority attributes. Once a command is retrieved, the command precedent processor accesses the command precedent database to determine all the events that are precedent to the execution of the retrieved command. Thereafter, the command precedent processor queries the event database to determine if all of the command's precedent events have occurred. If they have, then the command precedent processor forwards the command to the computer telephony system for execution. If all of the command precedent events have not occurred, then the command precedent processor will either return the unexecuted command to the appropriate command table for subsequent execution attempts or generate an alert message, which it will send to an alert manager to alert the system supervisor that a command could not be executed due to the non-occurrence of at least one precedent event. Finally, the command precedent processor updates the event database to reflect the execution of commands as command execution occurs.

DETAILED DESCRIPTION OF THE INVENTION

Figure 1:
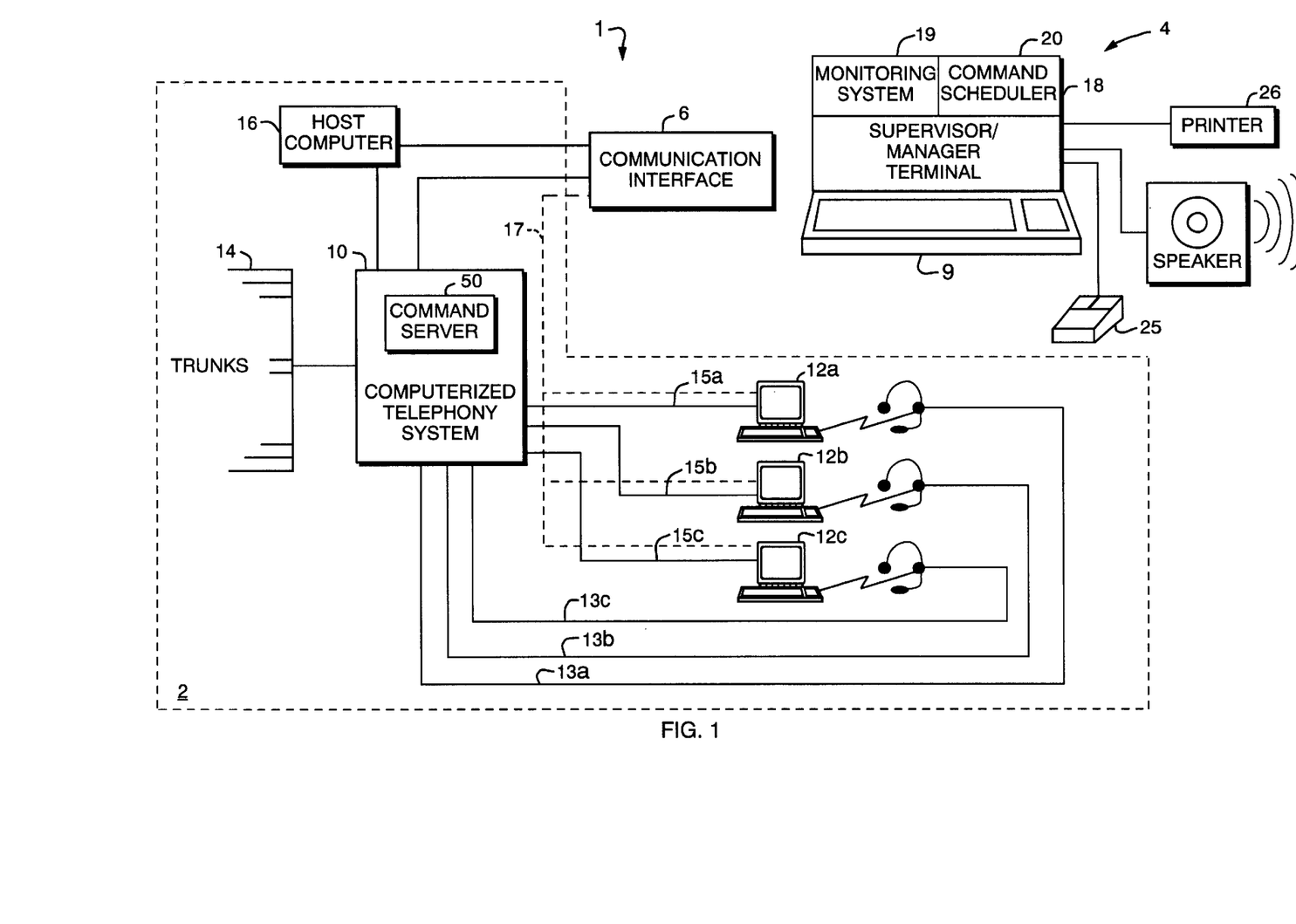
FIG. 1 is a block diagram of a computerized telephony system, including a command scheduler and precedent processor according to the invention.

Referring now to one embodiment of the present invention shown in FIG. 1, a computerized telephony system, generally designated as 1 is shown. The computerized telephony system includes a data processing system 2 and one or more system management systems 4. Each management system 4 communicates with the data processing system 2 via a communications interface 6. A variety of embodiments are contemplated by the present invention, which include alternative forms of communications interfaces. Examples include hard-wired management systems, which are physically connected to the data processing system 2, management systems that communicate with data processing the system via a local area network (LAN) using LAN devices, management systems that communicate with the data processing system over telephone lines using modems, and management systems that communicate with the data processing system over wide area networks (WANs), such as the Internet, using any combination of modems and/or WAN devices.

Data processing system 2, which may be, for example, a computerized autodialing system, typically used in high volume out-dialing environments such as collection departments, incorporates a computerized telephony system 10 as the hub of the automated system. A plurality of agent terminals 12A, 12B, 12C are connected to the computerized telephony system 10, which automatically dials out-bound calls from a predetermined list of phone numbers over a variable number of phone lines or trunks 14.

The computerized telephony system 10 generates event signals upon the occurrence of events such as no answers, lines that are busy, network intercepts or lines answered by message machines, and connects live calls to any one of the several agents 12A–12C over voice transmission lines 13A–13C. Upon transferring a live call to any one of the several agents, the computerized telephony system 10 also transfers selected data to the agent terminal over a data associated with the call transmission line 15A–15C. Alternatively, data may be transferred over an optional network line 17 to an agent from the management system 4 via communications interface 6.

The furnished data may be retrieved by the telephony system 10 from a host computer 16 having mass storage and database management capabilities. The agent receiving the live call addresses queries and/or collects information, accessing the host 16 database to store or retrieve the required information.

The telephony system 10 continues automatically placing out-bound calls and directing them to available agents while generating event signals in response to the placed calls and also transmitting event signals which can be utilized to generate statistics on agent and system performance.

Figure 2:
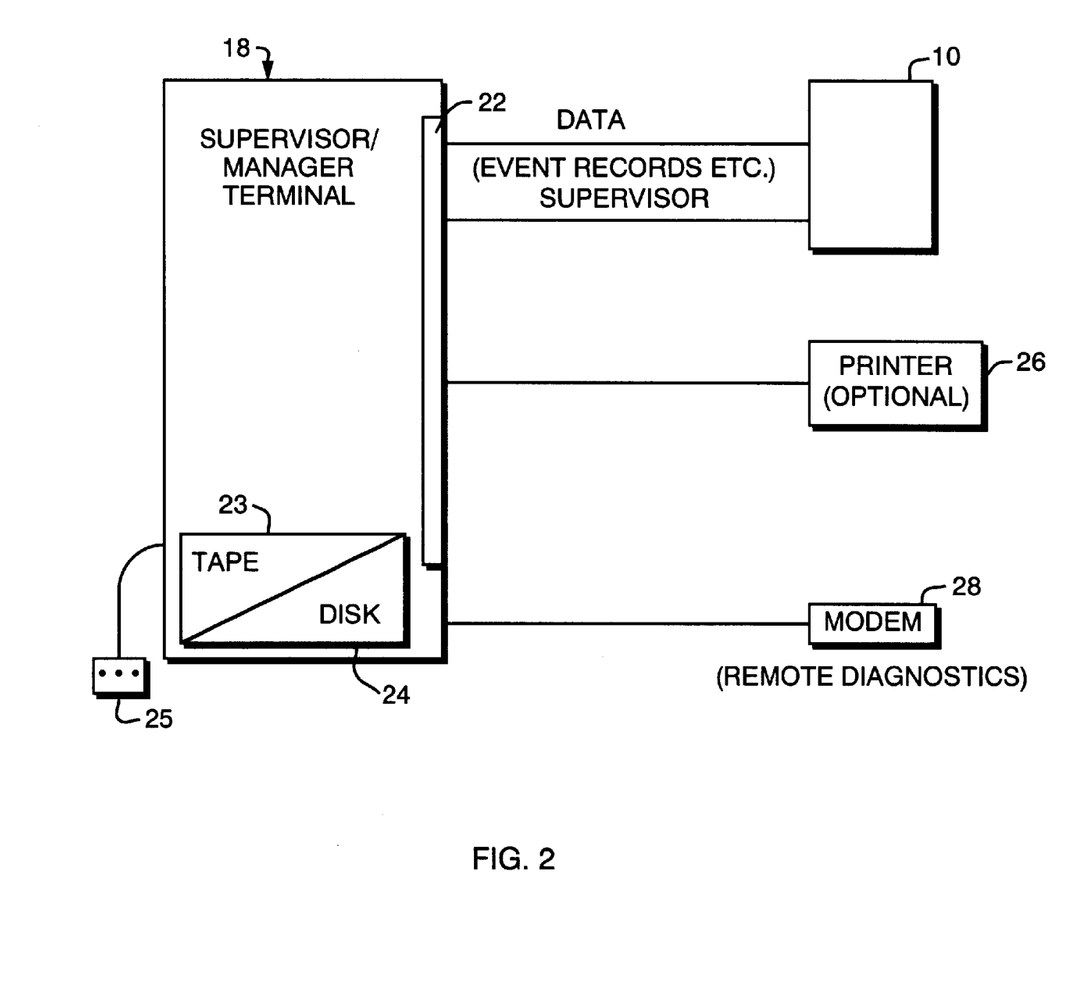
FIG. 2 is a more detailed block diagram of the supervisor/manager terminal of FIG. 1.

The management system 4 includes a supervisor/manager terminal 18 as illustrated in FIGS. 1 and 2, which is linked to the computerized telephony system 10 and assists in the management of the telephony system. The supervisor/manager terminal 18 comprises an integrated monitoring system 19 for providing the supervisor real-time access regarding the telephony system and the campaigns that it is processing. The supervisor/manager terminal 18 further comprises a command scheduler 20, which provides the supervisor with the ability to schedule commands for execution by the telephony system 10 in the near or distant future.

The supervisor/manager terminal 18 is preferably a smart terminal such as a reduced instruction set computer based parallel processing unit utilizing a UNIX Operating System, such as a Sun Sparc UNIX workstation. Alternatively, other UNIX based platforms can be used, such as a 486 based P.C. running UNIX or an IBM\RS6000, for IBM compatibility. The processor can be loaded to run off-the-shelf software for generating the user interface and accessing the database resident on the host 16. Preferably, the supervisor/manager terminal 18 is configured with a multi-port synchronous/asynchronous interface 22 and substantial mass storage capabilities such as a tape drive 23 for system backup and a disk drive 24 for maintaining a supervisor/manager terminal 18 resident database. A point and click mouse 25, having as many as three buttons, provides a suitable user interface to permit minimization of keyboard entries on keyboard 9. Speaker 27 may also be provided to produce an audible alarm to art a system supervisor of an alert condition.

In the embodiment of FIG. 2, the supervisor/manager terminal 18 is interfaced to the computerized telephony system 10 directly through the synchronous/asynchronous interface 22, which serves as the communications interface 6. However, additional communications strategies, as mentioned above, are contemplated by the present invention.

A printer 26 can optionally be dedicated to the supervisor/manager terminal 18 to provide hard copy output of reports generated at the terminal using an off-the-shelf spread sheet package. Optionally, a modem 28 can be provided for remotely accessing the supervisor/manager terminal 18 for performing system diagnostics and debugging from remote sites. With embodiments incorporating management systems 4 that are remote from the telephony system 10, the same communications interface 6, which interfaces the management system with the telephony system may be utilized for remote access to the supervisor/manager terminal 18.

A graphical user interface facilitates data access and manipulation and process monitoring and control through the point and click mouse 25 user interface which is menu and icon driven in accordance with a graphical user interface based on Open Windows running under the UNIX Operating System. Icon features enable a supervisor, using the mouse 25, to quickly move between functions by pointing and clicking to select either information or actions available on the supervisor/manager terminal 18.

Major supervisory functions are identified on the supervisor/manager terminal 18 by icons, as illustrated and more fully described in commonly owned U.S. Pat. No. 5,577,112, which is incorporated herein by reference.

Figure 3:
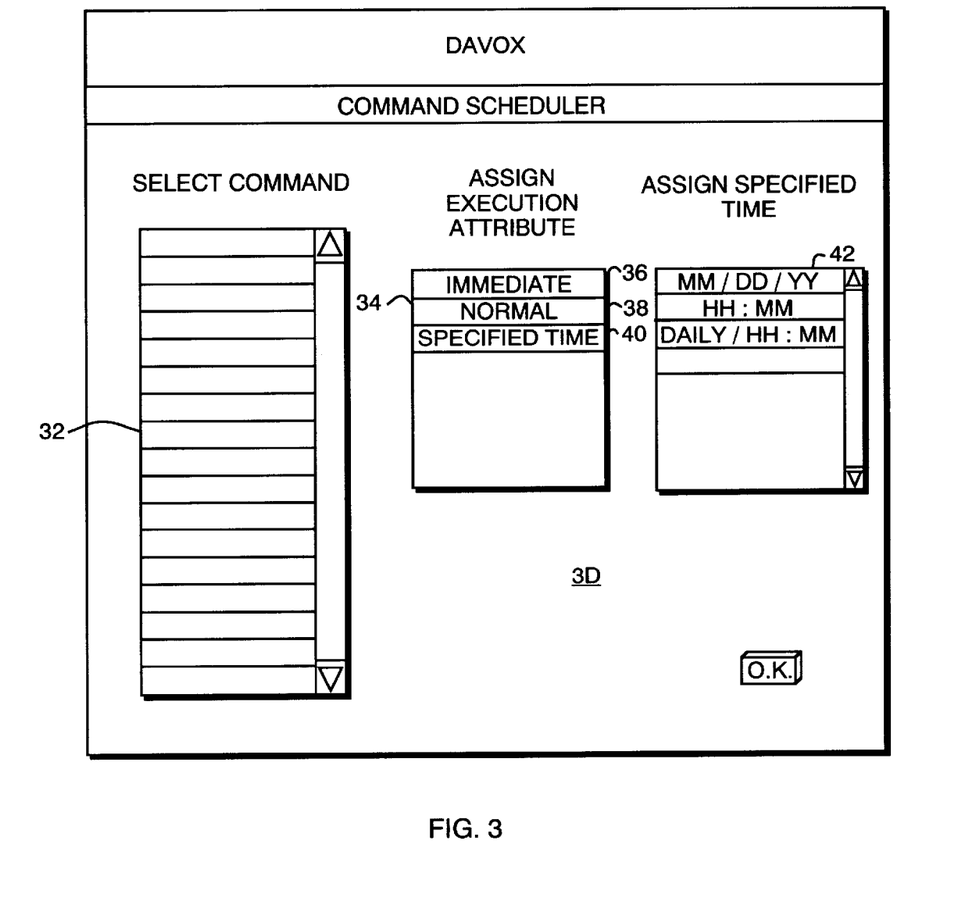
FIG. 3 is a screen display of the command scheduler graphical user interface of FIG. 1.

Turning now to FIG. 3, the command scheduler, which is also provided by the supervisor/manager terminal 18, itself comprises a graphical user interface 30 to facilitate the scheduling of telephony system commands. The available telephony system commands are provided by the graphical user interface 30 in a list of available commands 32. At least one command is selected from the list using the mouse 25 (FIGS. 1 & 2) by pointing and clicking to select a desired command. Once a command is selected, the graphical user interface prompts the supervisor to assign an execution priority attribute to the selected command. Like the list of available commands, a list of available command execution priority attributes 34 is provided by the command scheduler graphical user interface 30.

In the example shown, the available command execution priorities include an IMMEDIATE execution attribute 36, a NORMAL execution attribute 38, and a SPECIFIED TIME execution attribute 40. Thus, a system supervisor may select commands at one point in time and control either their relative or actual times of execution. For example, commands that have an IMMEDIATE execution attribute assigned thereto will be executed before those commands assigned a NORMAL execution attribute.

In addition, those commands assigned a SPECIFIED TIME execution attribute will be executed at the date and time specified in the date/time window 42 provided by graphical user interface 30. Specified time commands include commands that are scheduled for execution at a single date and time and those that are repetitive, specified time commands. An example of a repetitive specified command is a command that instructs the telephony system to suspend all autodialing activity on a daily basis between the hours of 9:00 p.m. and 9:00 a.m. the following day.

An example of a single date/time command is a command that instructs the telephony system to activate a specified call campaign on a specific date, at a specific time. Once a command is selected and an execution priority attribute is assigned thereto, the selected command is communicated to the telephony system 10 (FIG. 1) and, in particular, command server 50, where it is either immediately executed or stored for execution at a later point in time.

Figure 4:
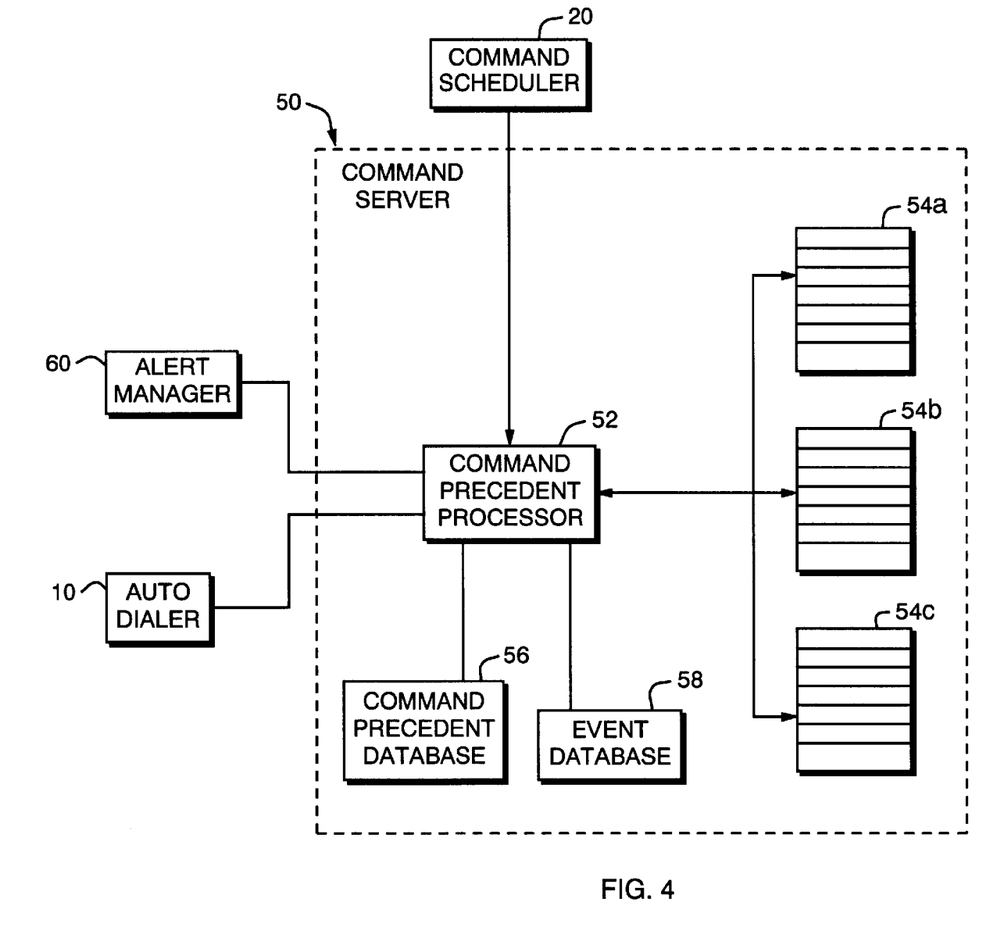
FIG. 4 is a more detailed block diagram of the command server of FIG. 1.

The components of the command server 50 are more fully shown in FIG. 4. Command server 50 comprises a command precedent processor 52 and a number of command tables 54, which correspond to the available command execution priority attributes that may be assigned to a command using the command scheduler 20 (FIG. 3). The illustrated embodiment includes three command tables 54a, 54b, and 54c, which correspond to IMMEDIATE commands, NORMAL commands and SPECIFIED TIME commands, respectively. When a command is scheduled using the command scheduler and is communicated to the command server 50, the command precedent processor 52 identifies the command execution attribute assigned to the received command and stores the received command in the appropriate command table 54.

The IMMEDIATE and NORMAL command tables utilize a first-in, first-out (FIFO) storage and retrieval strategy. In other words, commands are stacked in each command table and are executed in the order in which they are received. Of course, all of the commands in the IMMEDIATE command table must be executed before the command server attempts to execute any of the commands stored in the NORMAL command table. On the other hand, SPECIFIED TIME commands will be executed at the times so specified. If no command execution priority is assigned to a received command, the command scheduler stores the received command in the NORMAL command table by default.

The command server 50 also includes a command precedent database 56 and an event database 58. The command precedent database 56 comprises a knowledge base of all available computer telephony system commands and all the commands and other events that are required in order to execute each available command. The event database 58 includes a database of all executed commands and other events that have been performed or have occurred. When a command is retrieved from one of the command tables 54, the command precedent processor 52 accesses the command precedent database 56 and retrieves a list of all commands or events that are prerequisites for executing the retrieved command. The command precedent processor 52 then accesses the event database 58 and queries the database to determine if all of the retrieved command's precedents have occurred. If they have, then the command precedent processor forwards the retrieved command to the telephony system 10 for execution.

On the other hand, if one or more command precedents have not occurred, then the command precedent processor may employ one or more of the following strategies. First, for NORMAL commands, the precedent processor 52 may simply return the retrieved command to the NORMAL command table where it will be placed at the bottom of the NORMAL command stack. The command will be returned to the command precedent processor when it reaches the top of the stack. At that point the command precedent processor will once again retrieve the command, access the command precedent and event databases and determine if the command's precedent events have occurred. If so, then the command will be executed. If not, then the command will once again be returned to the command table. Of course, this process may be limited to a pre-specified number of command execution attempts before a system supervisor alert, which will be discussed below, is generated.

In an alternative embodiment of the invention, once a first command execution attempt is made and the command precedent processor determines that at least one command precedent event has not occurred, the command precedent processor may flag the unexecuted command as an unexecutable command before it is returned to the appropriate command table. Along with the unexecuted command flag, the command precedent processor may link, to the command those command precedent events that have not been satisfied. In this manner, upon subsequent command execution attempts, the command precedent processor will need only search the event database 58 to determine if the unsatisfied command precedent events have occurred. This would speed up the processing of commands during subsequent command execution attempts.

In addition, command precedent events along with commands may include instance identifiers to distinguish previously executed commands and their required precedent events from subsequent commands and precedents. An example of the need for this feature is for commands that are desired to be performed on a daily basis. In this scenario, it is important to distinguish precedents that were satisfied for one daily event but which have not yet been satisfied for a subsequent daily event. Another strategy would be to reset the event database to delete those precedent events that are of a repetitive nature and must be re-satisfied for repetitive type commands.

In the event that an IMMEDIATE execution priority command or a SPECIFIED TIME execution priority command cannot be executed due to the non-occurrence of one or more command precedent events, then the command precedent processor may generate an alert message and forward the same to the alert manager 60. The alert manager 60 will then alert a system supervisor, via supervisor/manager terminal 18 that the IMMEDIATE or SPECIFIED TIME command could not be executed. The alert message may include not only the unexecuted command but also those precedent events that have not yet occurred. In this manner a system supervisor may monitor system operation, force the occurrence of precedent events or over-ride a precedent requirement. A more detailed discussion of the alert manager 60 is provided in commonly owned U.S. Pat. No. 5,577,112, which is incorporated herein by reference.

Figure 5A:
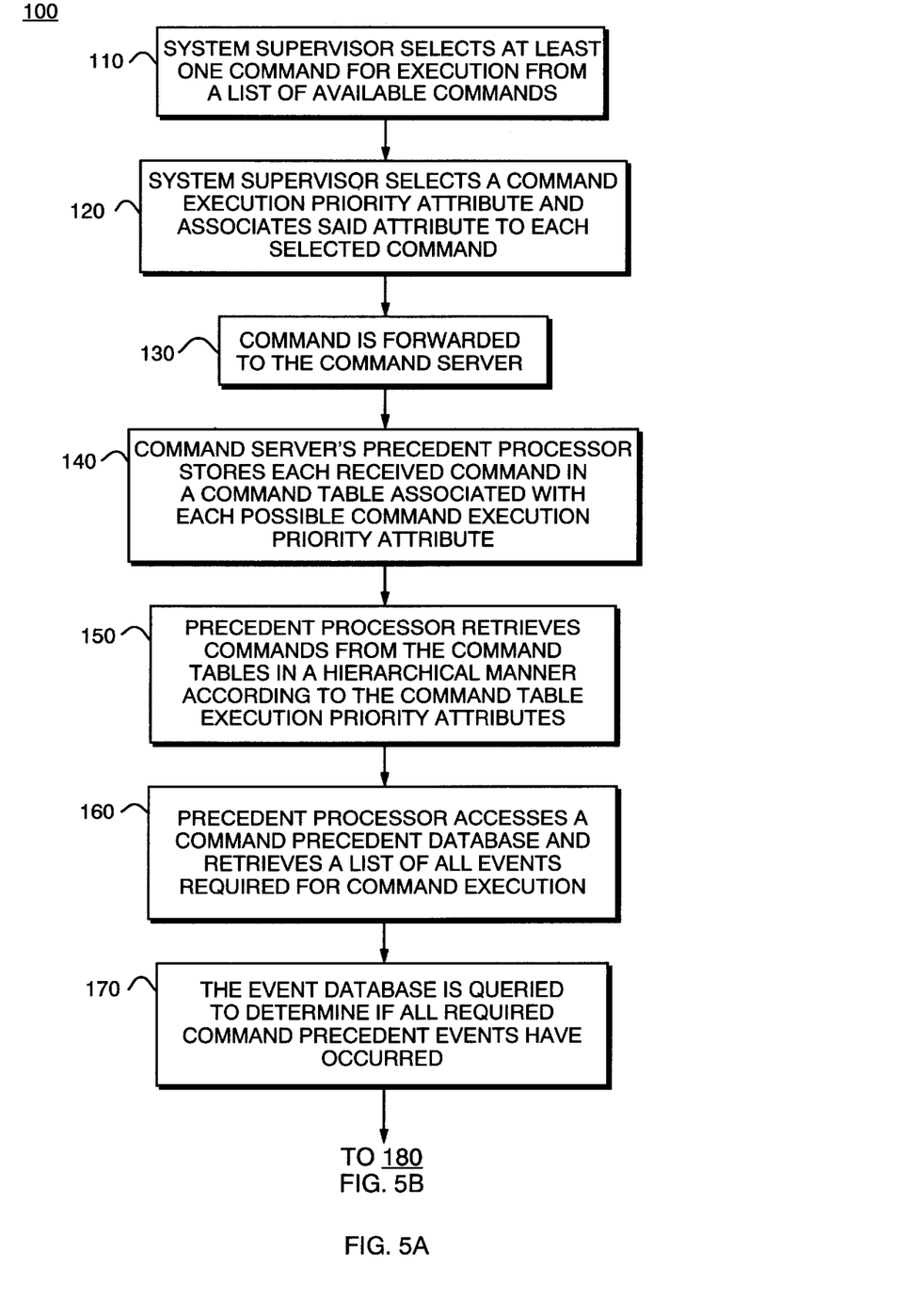
FIGS. 5A and 5B are flow diagrams of a method of command scheduling and precedent processing according to the invention.
Figure 5B:
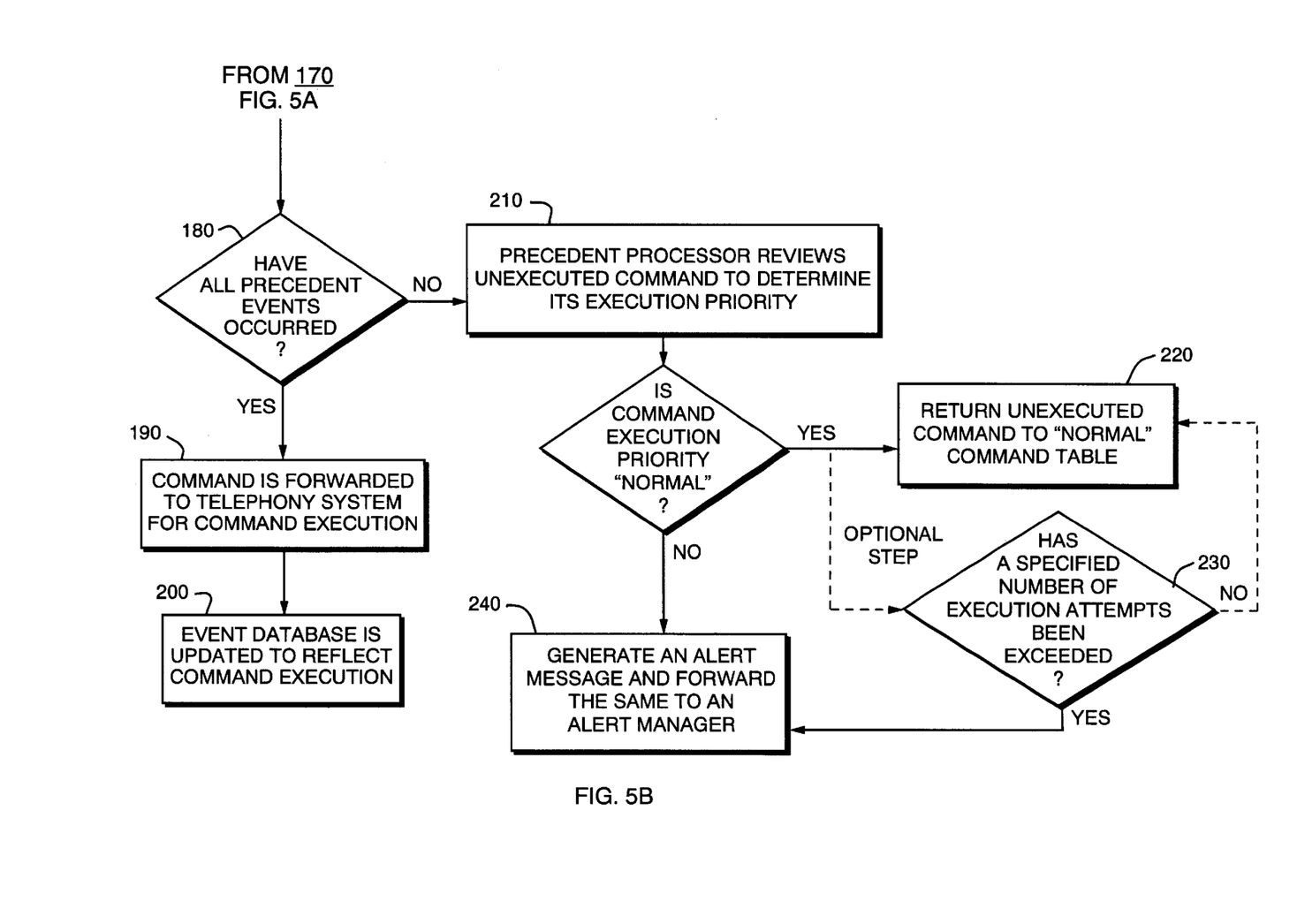

A flow chart diagramming a method of command scheduling 100 according to the present invention is provided in FIG. 5. The method 100 begins by a system supervisor selecting at least one command for execution from a list of available commands, step 110. In the preferred embodiment, the scheduling method is accomplished using a command scheduler graphical user interface, as discussed above. Once a command is selected, the supervisor selects a command execution priority attribute from a list of available command execution priority attributes provided by the graphical user interface, step 120. If the supervisor selects the SPECIFIED TIME command execution attribute, then the supervisor must also provide the desired command execution time to the command scheduler.

Once a command is selected and a command execution attribute and execution time, if required, are assigned thereto, then the command scheduler forwards the command to the command server via a communications interface, step 130, where it is received by the command precedent processor. The command precedent processor then identifies the command execution attribute assigned to the received command and stores the command in one of a number of command tables, step 140. The specific table is associated with the specified command execution attribute.

The command precedent processor processes commands as follows. First, the command precedent processor retrieves commands from the various command tables in a hierarchical manner according to the command table priority attributes, step 150. In the illustrative embodiment, commands that are assigned an IMMEDIATE command execution attribute are stored in an IMMEDIATE command table and are executed before commands that are assigned NORMAL command execution attributes, which are stored in a NORMAL command table. In the preferred embodiment, commands are retrieved from the IMMEDIATE and NORMAL command tables in a FIFO manner, namely, the first command stored in the stack is the first command retrieved.

Once a command is retrieved by the command precedent processor, the processor accesses a command precedent database to determine the precedent events required for the retrieved command's execution, step 160. Thereafter, the command precedent processor accesses an event database, step 170 and queries the event database to determine whether those precedent events have occurred, step 180. If all of the retrieved command's precedent events have occurred, then the command precedent processor forwards the command to the telephony system for command execution, step 190. The command precedent processor then updates the event database to indicate that the retrieved command has been executed, step 200.

On the other hand, if at least one precedent event has not occurred, then the precedent processor will not be able to forward the command for execution. In this case, the precedent processor will review the unexecutable command to determine its command execution priority, step 210. If the unexecuted command comprises a NORMAL execution priority, then the command precedent processor will return the unexecuted command to the NORMAL command table, step 220. Since the command table utilizes a FIFO strategy, the unexecuted command will advance up the command stack as the remaining commands stored in the NORMAL stack are executed until the unexecuted command returns to the top of the stack, upon the occurrence of which, the command precedent processor will again retrieve the unexecuted command and perform an additional execution attempt.

The second and each additional execution attempt will be performed in a manner similar to the first execution attempt described above, namely, the command precedent and event databases will be queried by the command precedent processor and a determination will be made as to whether all of the command's precedent events have occurred. If they have occurred, then the command will be executed on the appropriate subsequent attempt.

Optionally, a counter may be set to determine whether a command remains unexecuted after a specified number of execution attempts, step 230. If the specified number of attempts has occurred without command execution, then the command precedent processor will generate an alert message, which it will forward to an alert manager, step 240.

If the command has either an IMMEDIATE or SPECIFIED TIME command execution attribute and at least one of the command's precedent events has not occurred, then the command precedent processor will immediately generate an alert message and forward the same to the alert manager, step 240.

Although the invention has been shown and described with respect to exemplary embodiments thereof, various other changes, omissions and additions in form and detail thereof may be made without departing from the spirit and scope of the invention.

What is claimed is:

1. A computer telephony system command scheduling and precedent processing system comprising:
   a command scheduler graphical user interface running on at least one supervisor/manager terminal, said graphical user interface configured to facilitate the scheduling of computer telephony system commands, each said command including a command execution priority attribute;
   a command server including a set of command tables, each command table responsive to a different command execution priority attribute;
   a command precedent database containing a knowledge base of command precedent events;
   an event database for maintaining a record of the occurrence of events; and
   a command precedent processor, responsive to said command tables, said command precedent database and said event database, for directing said computer telephony system to execute each said telephony system command at a desired time subject to the occurrence of precedent events.

2. The computer telephony system command scheduling and precedent processing system as claimed in claim 1, wherein said set of command tables comprises an immediate execution command table.

3. The computer telephony system command scheduling and precedent processing system as claimed in claim 1, wherein said set of command tables comprises a normal execution command table.

4. The computer telephony system command scheduling and precedent processing system as claimed in claim 1, wherein said set of command tables comprises a specified time execution command table.

5. The computer telephony system command scheduling and precedent processing system as claimed in claim 1 further comprising an alert manager for alerting a system supervisor in the event that at least one command precedent event has not occurred at the time of command execution.

6. The computer telephony system command scheduling and precedent processing system as claimed in claim 1, wherein said command server comprises a UNIX workstation.

7. The computer telephony system command scheduling and precedent processing system as claimed in claim 1, wherein each command further comprises an instance identifier to distinguish previously executed commands from duplicate, subsequently required commands.

8. The computer telephony system command scheduling and precedent processing system as claimed in claim 1, wherein at least one of said command execution tables comprises a first-in, first-out command table.

9. The computer telephony system command scheduling and precedent processing system as claimed in claim 1, further comprising a communications interface for interfacing a supervisor/manager workstation with said command server when said supervisor/manager workstation is located remote from said command server.

10. The computer telephony system command scheduling and precedent processing system as claimed in claim 9, wherein said communications interface comprises a wide area network (WAN) device, which interfaces said supervisor/manager workstation with said command server over a wide area network.

11. The computer telephony system command scheduling and precedent processing system as claimed in claim 9, wherein said communications interface comprises a modem for linking said supervisor/manager workstation with said command server over telephone lines.

12. The computer telephony system command scheduling and precedent processing system as claimed in claim 10, wherein said wide area network comprises a global computer network.

13. The computer telephony system command scheduling and precedent processing system as claimed in claim 12, wherein said global computer network comprises the Internet World-Wide-Web and said command scheduler comprises a browser user interface.

14. A method of scheduling and processing telephony call system commands comprising the steps of:

selecting, using a graphical user interface running on a supervisor/manager workstation, a plurality of telephony system commands;

selecting, using said graphical user interface, a command execution priority attribute and associating said command execution priority attribute to each said selected command;

communicating each said selected command including said selected command execution priority attribute to a command server;

storing each said selected command in a command table, said command table corresponding to said command execution priority attribute associated with said selected command;

retrieving said stored commands in a hierarchical order based on said command priorities;

accessing a command precedent database and determining all required events precedent to executing each said retrieved command;

querying an event database to determine if all said required precedent events have occurred; and forward each said telephony system command to said telephony system for execution if all said required precedent events have occurred.

15. The method of scheduling and processing telephony call system commands as claimed in claim 14, further comprising the step of alerting a system supervisor/manager if at least one of said command execution precedent events has not occurred at the desired time of command execution.

16. The method of scheduling and processing telephony call system commands as claimed in claim 14, further comprising the step of returning an unexecuted telephony system command to one of said command tables if said command cannot be executed due to the non-occurrence of at least one command execution precedent event.

17. A command scheduling and precedent processing system comprising:

a command scheduler for scheduling the execution of commands including absolute and relative command execution priorities utilizing command execution priority attributes assigned to each scheduled command;

a command server including a set of command tables, each command table responsive to a command execution priority attribute;

a communications interface for interfacing said command scheduler and said command server;

a command precedent database containing a knowledge base of command precedent events;

an event database for maintaining a record of the occurrence of events; and a command precedent processor, responsive to said command tables, said command precedent database and said event database, for directing the execution of each scheduled command subject to the occurrence of precedent events.

* * * * *